Figure 1:

Dec. 6, 1966     J. M. HOUSTON     3,290,170
OXIDATION-RESISTANT COATING METHOD AND COATED ARTICLE
Filed Dec. 20, 1962

Inventor:
John M. Houston,
by John P. Dellitt
His Attorney.

United States Patent Office 3,290,170
Patented Dec. 6, 1966

3,290,170
OXIDATION-RESISTANT COATING METHOD
AND COATED ARTICLE
John M. Houston, Schenectady, N.Y., assignor to General
Electric Company, a corporation of New York
Filed Dec. 20, 1962, Ser. No. 246,168
1 Claim. (Cl. 117—131)

This invention relates to a method of coating metal articles to reduce the oxidation of said articles at high temperatures, and to articles formed thereby.

Oxidation is injurious to electrical conductors operated at high temperatures and may actually result in the physical destruction of such conductors as well as electrical failure thereof. During high temperature cycling of electrical devices, especially those formed of copper, the oxide, formed at a high operating temperature, tends to flake off at a lower temperature. Frequently conductors having a thickness as great as one-quarter inch have been entirely destroyed in this manner. Nonetheless, copper conductors are conventionally operated in air at high temperatures, as in outside structures and leads of high-temperature electron tubes, in the wiring of high temperature motors and generators as well as associated switch-gear equipment, and in the wiring of high temperature ovens, blast furnaces and the like.

Sometimes copper conductors are plated, as with nickel, in order to lessen the effects of oxidation. However, nickel coating is not truly protective, apparently because coating pinholes still allow the copper to become oxidized.

It is also known that an aluminum alloy on the surface of certain metals makes the metal more resistant to oxidation at elevated temperatures. This protective coating is known as Calorizing and is usually applied by heating the metal to a high temperature, e.g. to 600° C. for one hour in a reducing atmosphere (e.g. hydrogen) in intimate contact with finely divided aluminum. This process is expensive and cumbersome, however, and takes special equipment, particularly to provide the reducing atmosphere.

It is therefore an object of the present invention to provide an improved method of protecting electrical conductors and the like, from oxidation at high temperatures and with a minimum of effort and equipment.

I have discovered that coating copper conductors and the like with gallium produces the desired protective action. Gallium coating usually does not require special equipment for its application, but has the advantage that it can be applied in air at temperatures near room temperature. Gallium has a melting point of 30° C. (86° F.) only slightly above room temperature. Furthermore, if the gallium is alloyed with a small amount of diluent, alloyed with the gallium for reducing its melting temperature, the gallium can be applied at room temperature and may be easily painted on with a brush or the like.

A very thin coating of gallium is applied to the metal to be protected, and the metal is either heated in air or allowed to heat during its normal high temperature function so as to produce a thin, solid and oxidation-resistant alloy coating on the surface of the metal.

Figure 2:
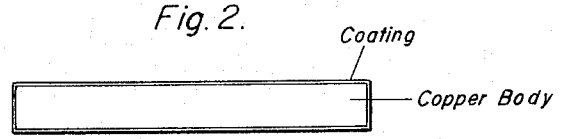
Figure 3:
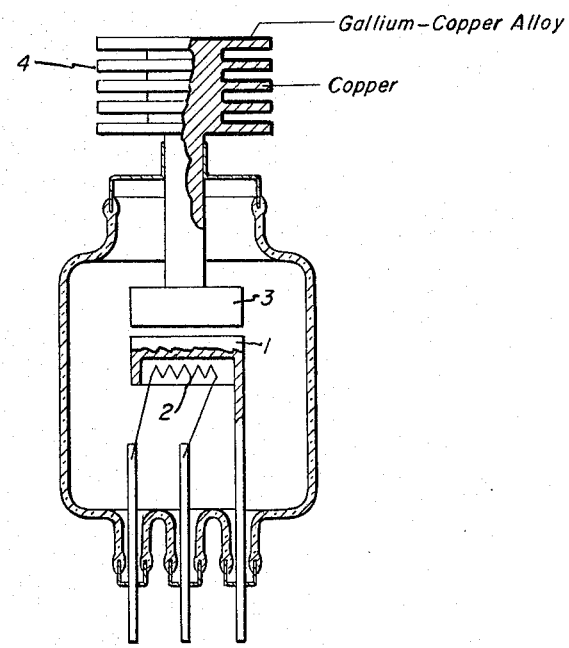

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 illustrates a metal conductor,
FIG. 2 is a cross-section of a metal conductor with gallium alloy coating, and
FIG. 3 is a cross-sectional view of a high temperature electron tube having exposed copper parts protected with gallium alloy coating.

In FIG. 1 there is illustrated a body of copper material, or copper containing material, which is to be rendered oxidation-resistant. This is accomplished by applying a gallium or gallium-rich alloy coating to the body at or slightly above the coating material's melting temperature, with a paint brush or the like. The coating thickness will not be found to be particularly critical, but has an optimum range between 0.5 and 2 milligrams per square centimeter, of gallium, this corresponding to a gallium coating thickness of between 0.85 and 3.4 microns. Thicker coatings tend to run, the liquid gallium accumulating in droplets, while thinner coatings frequently do not produce the desired protection. Mechanical rubbing as with a cloth aids in obtaining a uniformly thin coating. Since the coating is very thin, the gallium does not saturate the underlying body, but subsequently forms only a very thin protective layer thereon. After initial application of the gallium coating to the body, the body has the shiny silvery appearance of gallium metal. A gallium (or gallium-rich alloy) coated body is illustrated in FIG. 2.

The gallium coated object is then desirably heated in air to the temperature, or slightly above the temperature, the object must withstand during normal use. Of course such a temperature is met in the course of subjecting the metal body to its usual purpose, but pre-heating the object, first, avoids the possibility of a wet or molten gallium or gallium alloy surface condition, even for a short period of time. Thus if the coated object is to normally withstand a temperature of 400° C., it is desirable to first heat the object to 500° C. for an hour and preferably two. After such time, a golden-colored surface layer of copper-gallium alloy is present on the object, which then persists in a relatively unchanged condition with subsequent heating in air to a temperature as much as 500° C. Alloying the gallium to the copper metal body may be speeded up by raising the body to a higher temperature for a shorter period of time. For example at 800° C., the alloying action requires from about one-half to one minute.

The copper-gallium alloy formed has a melting point equal to or higher than the highest temperature reached. When the surface is cooled, the alloy remains as a thin solid protective layer. The layer is extremely tenacious and adherent to the underlying body, even though the body is bent or formed into varying shapes. Thus if the body comprises copper wire, the wire may be normally bent into various configurations without injuring the protective layer. The source of the oxidation-resistant coating is believed to be a thin gallium-oxide film.

The copper-gallium alloy is quite thin, on the order of microns, and is frequently hard to detect except for the resistance to oxidation and the color. The thickness of the coating is difficult to measure but is believed to be between 0.85 and sixty microns. Thicker protective-alloy coatings can be produced by alternate painting-on and alloying-in of gallium or gallium alloy.

FIG. 3 illustrates an electron tube having a cathode 1, a filamentary heater 2, and an anode 3, which operates at high temperature and has high heat dissipation requirements. For this reason a heat dissipator 4 is joined to the anode and provides both electrical connection and heat dissipation by means of radiation, convection, and conduction. This heat dissipator is conveniently formed of copper and therefore is subject to oxidation not only in the initial bakeout of the tube during manufacture but also in subsequent operation. Initial manufacturing bakeout of such a tube is typically in the range between 400° C. and 600° C. During operation such a tube may cycle between room temperature and temperatures as high as 500° C.

In accordance with the present invention the exposed dissipator 4 is coated with a gallium coating prior to bakeout and operation. The tube heat dissipator may be coated with melted gallium or a gallium-rich alloy at room temperature or slightly above as by painting the dissipator using a paint brush or as by momentarily dipping the dissipator in molten protective coating metal or otherwise applying the coating so the dissipator is wet by the coating metal. After heating, a solid protective gallium-copper alloy is present on the heat dissipator surface.

Available gallium is, of course, only obtainable in relative conditions of purity; for example conventionally obtainable "pure" gallium is 99.99% pure. The gallium is, however, effective to produce an oxidation-resistant coating if present in considerably less concentrated amounts, i.e. if it is first alloyed with a diluent comprising an alloying metal. Metals which are preferred for this purpose are those producing an alloy with the gallium, which alloy has a melting point lower than room temperature. Appropriate alloying metals are indium, tin, cadmium and zinc, for example.

Tests have been made with an alloy consisting of 62.5% gallium, 21.5% indium and 16% tin. This alloy is useful because of its low melting point of 10.7° C. It may be applied to metal surfaces, e.g. copper surfaces which are to be protected, in the same thickness and for the same temperature ranges as pure gallium in the manner hereinbefore set forth. The gallium is the ingredient responsible for the oxidation protection and therefore should desirably be present in such an alloy to an extent of over 50%, even though there is no reduced percentage of gallium for which the resulting alloy ceases to offer some protection. However, if the percentage is lower than 50%, the alloy when applied to copper body is less effective especially in a copper wire "bend" test. The coatings including more than 50% gallium form a more adherent coating which is less likely to crack or rupture when the underlying article is formed into different shapes. The percentage of the diluent metal included, e.g. indium, tin, cadmium and zinc is not critical. These metals can be used for diluent and melting temperature lowering purposes in varying quantities and combinations.

By way of specific example, a copper sheet 1" x ¼" x 0.0015" was coated with approximately one milligram per square centimeter of molten gallium and was placed in an electrically heated air oven where it was then heated to 500° C. for 48 hours. When the sample was removed it had changed from its original silver color to a golden color because of the surface alloy of the gallium and the copper. The copper sample showed no visible oxidation and remained ductile. An identical copper sample which was not coated with gallium was completely converted to black copper oxide, i.e. no metal remained.

The same test was repeated at 600° C. for 48 hours with the same results.

In another test, gallium was first alloyed with indium and tin slightly above room temperature to form an alloy consisting of 62.5% gallium, 21.5% indium, and 16% tin, all percentages being by weight. Copper samples of 0.002" in thickness and 0.02" in thickness were coated at room temperature with approximately 1 milligram per square centimeter of Ga–In–Sn alloy and baked in air as follows: 24 hours at 300° C.; then 24 hours at 400° C., followed by 24 hours at 450° C. The sample showed no visible sign of oxidation but remained ductile and could be bent without any sign of cracking or flaking.

In another instance, the same alloy was applied to samples of 0.0015" and 0.012" thick copper sheet with 1±0.5 milligram per square centimeter of the aforementioned alloy. These samples were baked at 600° C. for 48 hours. The samples emerged golden or bronze in color and all of the samples were ductile and showed no signs of oxidation. The 0.012" thick sample was sectioned, polished, and examined under metallographic microscope. The copper substrate appeared normal. At the surface of the samples, a layer with a yellow-green color could be observed. This layer did not consist of any visible change in the crystal structure of the copper but indeed was detectable only as a slight change in color. At the junction of this yellow-green layer and the copper substrate, a row of small voids or inclusions a few microns in diameter was observed. The yellow-green surface layer appeared to be the result of gallium, indium and tin diffusing into the copper to form the surface alloy layer. The layer is about 60 microns deep after the 600° C. bake and in similar tests the layer was 7 microns deep after a 48 hour bake at 400° C. and 25 microns deep after a 500° C. bake.

In another test, samples of 0.125" in diameter copper rod and also 0.02" copper sheet were coated with the aforementioned alloy with 1±0.5 milligram per square centimeter. The samples were baked in air in an oven at 500° C. for 1, 3, 13 and 42 days. All samples emerged in good condition. The copper was ductile and free from visible oxidation.

In another instance, four samples of 0.06" diameter copper wire were coated, two with gallium and two with the aforementioned Ga–In–Sn alloy. They were heated in an oven from 30 minutes to 12 hours at 500° C. to form the thin protective layer. Then they were bent in an 180° bend around a mandrel 0.187" in diameter and reheated to 500° C. for 6 days. When removed, only one sample showed a slight "greying" of the protective surface at the bend, the other samples being unaffected by the bend.

While I have shown and described several embodiments of my invention, it will be apparent to those skilled in the art that many changes and modifications may be made without departing from my invention in its broader aspects; and I therefore intend the appended claim to cover all such changes and modifications as fall within the true spirit and scope of my invention.

What I claim as new and desire to secure by Letters Patent of the United States is:

A method of rendering a copper body oxidation-resistant comprising coating said copper body with a thin layer of gallium alloy having approximately the composition in weight percent of 62.5% gallium, 21.5% indium, and 16% tin, and heating said copper body to a temperature for forming a thin solid gallium-indium-tin copper alloy on the surface of said copper body.

References Cited by the Examiner

UNITED STATES PATENTS

| | | | |
|---|---|---|---|
| 2,700,623 | 1/1955 | Hall | 117—71 |
| 2,898,230 | 8/1959 | Bulloff | 117—107.1 |
| 2,906,002 | 9/1959 | Nagorsen et al. | 29—25.3 |
| 2,952,725 | 9/1960 | Evans et al. | 136—4 |
| 3,141,238 | 7/1964 | Harman | 29—498 |
| 3,183,588 | 5/1965 | Pruna | 117—131 X |

RALPH S. KENDALL, *Primary Examiner.*

ALFRED L. LEAVITT, *Examiner.*